US008606709B2

(12) United States Patent
Gupta

(10) Patent No.: US 8,606,709 B2
(45) Date of Patent: *Dec. 10, 2013

(54) SYSTEMS, METHODS, AND DEVICES FOR COMBINED CREDIT CARD AND STORED VALUE TRANSACTION ACCOUNTS

(75) Inventor: Ashish Gupta, Miramar, FL (US)

(73) Assignee: American Express Travel Related Services Company, Inc., New York, NY (US)

( * ) Notice: Subject to any disclaimer, the term of this patent is extended or adjusted under 35 U.S.C. 154(b) by 246 days.

This patent is subject to a terminal disclaimer.

(21) Appl. No.: 12/961,909

(22) Filed: Dec. 7, 2010

(65) Prior Publication Data
US 2011/0078082 A1 Mar. 31, 2011

Related U.S. Application Data

(63) Continuation of application No. 10/711,290, filed on Sep. 8, 2004, now Pat. No. 7,870,071.

(51) Int. Cl.
*G06Q 40/00* (2012.01)
(52) U.S. Cl.
CPC .................................. *G06Q 40/00* (2013.01)
USPC .......................................................... 705/40
(58) Field of Classification Search
None
See application file for complete search history.

(56) References Cited

U.S. PATENT DOCUMENTS

| 4,650,978 | A | 3/1987 | Hudson et al. |
|---|---|---|---|
| 5,023,782 | A | 6/1991 | Lutz et al. |
| 5,276,311 | A | 1/1994 | Hennige |
| 5,326,960 | A | 7/1994 | Tannenbaum |
| 5,494,544 | A | 2/1996 | Hill et al. |
| 5,500,513 | A | 3/1996 | Langhans et al. |
| 5,577,109 | A | 11/1996 | Stimson et al. |
| 5,585,787 | A | 12/1996 | Wallerstein |
| 5,590,038 | A | 12/1996 | Pitroda |
| 5,614,703 | A | 3/1997 | Martin et al. |
| 5,627,909 | A | 5/1997 | Blaylock et al. |
| 5,649,118 | A | 7/1997 | Carlisle et al. |
| 5,661,289 | A | 8/1997 | Sasou et al. |
| 5,687,323 | A | 11/1997 | Hodroff |
| 5,721,768 | A | 2/1998 | Stimson et al. |
| 5,760,381 | A | 6/1998 | Stich et al. |
| 5,777,305 | A | 7/1998 | Smith et al. |

(Continued)

OTHER PUBLICATIONS

USPTO; Office Action dated Apr. 25, 2008 in U.S. Appl. No. 10/711,290.

(Continued)

*Primary Examiner* — Bruce I Ebersman
(74) *Attorney, Agent, or Firm* — Snell & Wilmer L.L.P.

(57) ABSTRACT

The present invention generally relates to a single transaction account identifier that can be used for in transactions with one of multiple transaction accounts. The method includes one or more of the following steps: establishing at least two transaction accounts, wherein the transaction accounts are respectively associated with transaction account identifiers; receiving, at a transaction processing system, a common account identifier; recognizing the common account identifier as being associated with more than one account; and determining, which of the at least two transaction accounts to access for processing the transaction. The determining step may be based on selection criteria and the selection criteria may be modified by a user. One of the first and second transaction account identifiers may be forwarded to the respective first and second transaction accounts based on the determining step; and the transaction may be processed via the selected transaction account.

15 Claims, 2 Drawing Sheets

(56) References Cited

U.S. PATENT DOCUMENTS

| | | | |
|---|---|---|---|
| 5,826,242 A | 10/1998 | Montulli | |
| 5,864,830 A | 1/1999 | Armetta et al. | |
| 5,878,141 A | 3/1999 | Daly et al. | |
| 5,883,810 A | 3/1999 | Franklin et al. | |
| 5,884,280 A | 3/1999 | Yoshioka et al. | |
| 5,897,622 A | 4/1999 | Blinn et al. | |
| 5,903,830 A | 5/1999 | Joao et al. | |
| 5,903,875 A | 5/1999 | Kohara | |
| 5,903,880 A | 5/1999 | Biffar | |
| 5,909,492 A | 6/1999 | Payne et al. | |
| 5,917,168 A | 6/1999 | Nakamura et al. | |
| 5,930,777 A | 7/1999 | Barber | |
| 5,936,221 A | 8/1999 | Corder et al. | |
| 5,952,639 A | 9/1999 | Ohki et al. | |
| 5,956,699 A | 9/1999 | Wong et al. | |
| 5,960,411 A | 9/1999 | Hartman et al. | |
| 5,963,915 A | 10/1999 | Kirsch | |
| 5,966,697 A | 10/1999 | Fergerson et al. | |
| 5,970,471 A | 10/1999 | Hill | |
| 5,970,472 A | 10/1999 | Allsop et al. | |
| 5,970,473 A | 10/1999 | Gerszberg et al. | |
| 5,970,475 A | 10/1999 | Barnes et al. | |
| 5,971,276 A | 10/1999 | Sano et al. | |
| 5,988,509 A | 11/1999 | Taskett | |
| 5,991,413 A | 11/1999 | Arditti et al. | |
| 5,991,748 A | 11/1999 | Taskett | |
| 6,000,832 A | 12/1999 | Franklin et al. | |
| 6,002,767 A | 12/1999 | Kramer | |
| 6,003,763 A | 12/1999 | Gallagher et al. | |
| 6,009,412 A | 12/1999 | Storey | |
| 6,014,634 A | 1/2000 | Scroggie et al. | |
| 6,014,635 A | 1/2000 | Harris et al. | |
| 6,014,636 A | 1/2000 | Reeder | |
| 6,014,648 A | 1/2000 | Brennan | |
| 6,014,650 A | 1/2000 | Zampese | |
| 6,016,476 A * | 1/2000 | Maes et al. | 705/18 |
| 6,024,288 A | 2/2000 | Gottlich et al. | |
| 6,029,890 A | 2/2000 | Austin | |
| 6,032,136 A | 2/2000 | Brake, Jr. et al. | |
| 6,038,552 A | 3/2000 | Fleischl et al. | |
| 6,045,050 A | 4/2000 | Ippolito et al. | |
| 6,076,076 A | 6/2000 | Gottfreid | |
| RE36,788 E | 7/2000 | Mansvelt et al. | |
| 6,095,411 A | 8/2000 | Schrenk | |
| 6,105,008 A | 8/2000 | Davis et al. | |
| 6,106,020 A | 8/2000 | Leef et al. | |
| 6,125,352 A | 9/2000 | Franklin et al. | |
| 6,134,309 A | 10/2000 | Carson | |
| 6,163,771 A | 12/2000 | Walker et al. | |
| 6,189,787 B1 | 2/2001 | Dorf | |
| 6,267,292 B1 | 7/2001 | Walker et al. | |
| 6,270,012 B1 | 8/2001 | Dawson | |
| 6,298,336 B1 | 10/2001 | Davis et al. | |
| 6,315,195 B1 | 11/2001 | Ramachandran | |
| 6,341,724 B2 | 1/2002 | Campisano | |
| 6,375,073 B1 | 4/2002 | Aebi et al. | |
| 6,386,457 B1 | 5/2002 | Sorie | |
| 6,402,029 B1 | 6/2002 | Gangi | |
| 6,578,761 B1 | 6/2003 | Spector | |
| 6,588,658 B1 | 7/2003 | Blank | |
| 6,615,190 B1 | 9/2003 | Slater | |
| 6,675,153 B1 | 1/2004 | Cook et al. | 705/74 |
| 6,882,983 B2 | 4/2005 | Furphy et al. | 705/30 |
| 7,089,208 B1 | 8/2006 | Levchin et al. | 705/39 |
| 7,155,411 B1 | 12/2006 | Blinn et al. | 705/40 |
| 7,184,979 B1 * | 2/2007 | Carson | 705/35 |
| 7,225,156 B2 | 5/2007 | Fisher et al. | 705/50 |
| 7,318,049 B2 * | 1/2008 | Iannacci | 705/39 |
| 7,392,222 B1 | 6/2008 | Hamilton et al. | 705/39 |
| 7,401,731 B1 * | 7/2008 | Pletz et al. | 235/380 |
| 7,430,537 B2 | 9/2008 | Templeton et al. | 705/39 |
| 7,571,139 B1 * | 8/2009 | Giordano et al. | 705/40 |
| 7,571,140 B2 * | 8/2009 | Weichert et al. | 705/40 |
| 8,412,623 B2 * | 4/2013 | Moon et al. | 705/39 |
| 2001/0032878 A1 | 10/2001 | Tsiounis et al. | |
| 2001/0047342 A1 | 11/2001 | Cuervo | |
| 2001/0051923 A1 | 12/2001 | Kosuda | |
| 2002/0004783 A1 | 1/2002 | Paltenghe et al. | 705/41 |
| 2002/0026418 A1 | 2/2002 | Koppel et al. | |
| 2002/0069145 A1 | 6/2002 | Collado et al. | 705/32 |
| 2002/0095387 A1 | 7/2002 | Sosa et al. | |
| 2002/0120563 A1 | 8/2002 | McWilliam et al. | 705/39 |
| 2002/0174016 A1 | 11/2002 | Cuervo | 705/16 |
| 2002/0191816 A1 | 12/2002 | Maritzen et al. | 382/115 |
| 2003/0023549 A1 | 1/2003 | Armes et al. | 705/40 |
| 2003/0028458 A1 * | 2/2003 | Gaillard | 705/35 |
| 2003/0028492 A1 | 2/2003 | Levenson et al. | |
| 2003/0046567 A1 | 3/2003 | Carman | |
| 2003/0050898 A1 | 3/2003 | Oppat et al. | |
| 2003/0061157 A1 * | 3/2003 | Hirka et al. | 705/39 |
| 2003/0074317 A1 | 4/2003 | Hofi | 705/44 |
| 2003/0112936 A1 * | 6/2003 | Brown et al. | 379/121.02 |
| 2003/0154163 A1 | 8/2003 | Phillips et al. | 705/39 |
| 2004/0049452 A1 * | 3/2004 | Blagg | 705/39 |
| 2004/0117302 A1 | 6/2004 | Weichert et al. | 705/40 |
| 2004/0151353 A1 | 8/2004 | Topping | 382/124 |
| 2005/0021400 A1 | 1/2005 | Postrel | 705/14 |
| 2005/0177507 A1 | 8/2005 | Bandych et al. | 705/40 |
| 2005/0234778 A1 * | 10/2005 | Sperduti et al. | 705/22 |
| 2005/0283430 A1 | 12/2005 | Reid et al. | 705/39 |
| 2006/0016875 A1 | 1/2006 | Bonalle et al. | 235/380 |
| 2006/0021019 A1 | 1/2006 | Hinton et al. | 726/10 |
| 2006/0064372 A1 * | 3/2006 | Gupta | 705/39 |
| 2008/0010189 A1 | 1/2008 | Rosenberger | 705/39 |

OTHER PUBLICATIONS

USPTO; Final Office Action dated Oct. 3, 2008 in U.S. Appl. No. 10/711,290.

USPTO; Advisory Action dated Feb. 26, 2009 in U.S. Appl. No. 10/711,290.

USPTO; Office Action dated May 12, 2009 in U.S. Appl. No. 10/711,290.

USPTO; Final Office Action dated Dec. 8, 2009 in U.S. Appl. No. 10/711,290.

USPTO; Advisory Action dated Feb. 4, 2010 in U.S. Appl. No. 10/711,290.

USPTO; Office Action dated Mar. 23, 2008 in U.S. Appl. No. 10/711,290.

USPTO; Notice of Allowance dated Sep. 22, 2010 in U.S. Appl. No. 10/711,290.

PCT; International Search Report dated May 10, 2007 in Application No. PCT/US2005/032032.

PCT; Written Opinion dated May 10, 2007 in Application No. PCT/US2005/032032.

PCT; International Preliminary Report on Patentability dated Jun. 5, 2007 in Application No. PCT/US2005/032032.

Piggly Wiggly Touches New Payment Ground, CMP Media. Inc. Sep. 2004.

The Business Case for Biometrics (in banks) Bank Systems and Technology, vol. 39, No. 2 pp. 42, Feb. 2002.

BioNetrix Suite Covers All the Bases—Network Computing, n 1026 p. 47, Dec. 27, 1999.

* cited by examiner

SYSTEMS, METHODS, AND DEVICES FOR COMBINED CREDIT CARD AND STORED VALUE TRANSACTION ACCOUNTS

CROSS REFERENCE TO RELATED APPLICATIONS

This application is a continuation of, and claims priority to, U.S. patent application Ser. No. 10/711,290, entitled "SYSTEMS, METHODS, AND DEVICES FOR COMBINED CREDIT CARD AND STORED VALUE TRANSACTION ACCOUNTS" filed on Sep. 8, 2004.

FIELD OF INVENTION

The present invention generally relates to transaction accounts, and more particularly, to systems and methods for facilitating selective use of two or more accounts associated with a single transaction account identifier.

BACKGROUND OF THE INVENTION

Consumers may use a transaction account, wherein the transaction account may be associated with an account identifier and/or transaction card (e.g., credit card, stored value card, gift card), as a form of payment in various transactions. Transaction accounts are desirable for a number of reasons such as, for example, utilizing a transaction account associated with a stored value (e.g., pre-paid) card may be a safe and convenient way to avoid carrying or handling cash and loose change. Moreover, if a consumer desires cash, many transaction cards allow access to funds through an automated teller machine (ATM). Stored value cards are frequently referred to as gift, pre-paid or cash cards, in that money is deposited or activated in the account associated with the card before use of the card is allowed. Also, it is often convenient to give pre-paid cards as gifts or to use pre-paid cards to pay for transactions while traveling.

Furthermore, credit cards are desirable for various reasons, for example, for purchasing products when the user does not have the cash value immediately available, for emergency purchases, and for purchasing items over the interne. While loyalty cards, gift cards, and other transaction accounts are desirable devices, it is often cumbersome to carry multiple cards. Moreover, in some instances, the user may not have a particular transaction instrument on their person at the time that the user desires to use that instrument.

Thus, additional systems and methods are desired to facilitate use of multiple transaction accounts and/or transaction instruments based on a single account identifier. Furthermore, a need exists for systems and methods that enable a consumer to use one transaction account identifier, such as that on a credit card, to perform a transaction on a different transaction account, such as a stored value account.

SUMMARY OF THE INVENTION

The present invention generally relates to a common transaction account identifier that can be used in transactions associated with one of multiple transaction accounts. The method includes one or more of the following steps: establishing at least two transaction accounts, wherein the transaction accounts are respectively associated with transaction account identifiers (e.g., numbers, letters, symbols, signals and/or the like); receiving, at a transaction processing system, a common account identifier; recognizing the common account identifier as being associated with more than one account; and determining, which of the at least two transaction accounts to access for processing the transaction. The determining step may be based on selection criteria and the selection criteria may be modified by a user of the first and second transaction accounts. One of the first and second transaction account identifiers may be forwarded to the respective first and second transaction accounts based on the determining step; and the transaction may be processed via the selected transaction account.

BRIEF DESCRIPTION OF THE DRAWINGS

A more complete understanding of the present invention may be derived by referring to the detailed description and claims when considered in connection with the Figures, wherein like reference numbers refer to similar elements throughout the Figures, and:

DETAILED DESCRIPTION OF EXEMPLARY EMBODIMENTS

While the exemplary embodiments herein are described in sufficient detail to enable those skilled in the art to practice the invention, it should be understood that other embodiments may be realized and that logical and mechanical changes may be made without departing from the spirit and scope of the invention. Thus, the following detailed description is presented for purposes of illustration only and not of limitation.

In general, systems, methods, and devices are suitably configured to facilitate transactions using one of two or more transaction accounts through use of a single "common" account identifier. Such use may be facilitated by, for example, a transaction account system recognizing the common account identifier as being associated with multiple accounts, and using rules (i.e., selection criteria) to determine which of the multiple transaction accounts is to be involved in the transaction. Use of multiple transaction accounts may be further facilitated by accessing the corresponding transaction account. Accessing the account may include forwarding the appropriate transaction account identifier to the corresponding transaction account.

Figure 1:
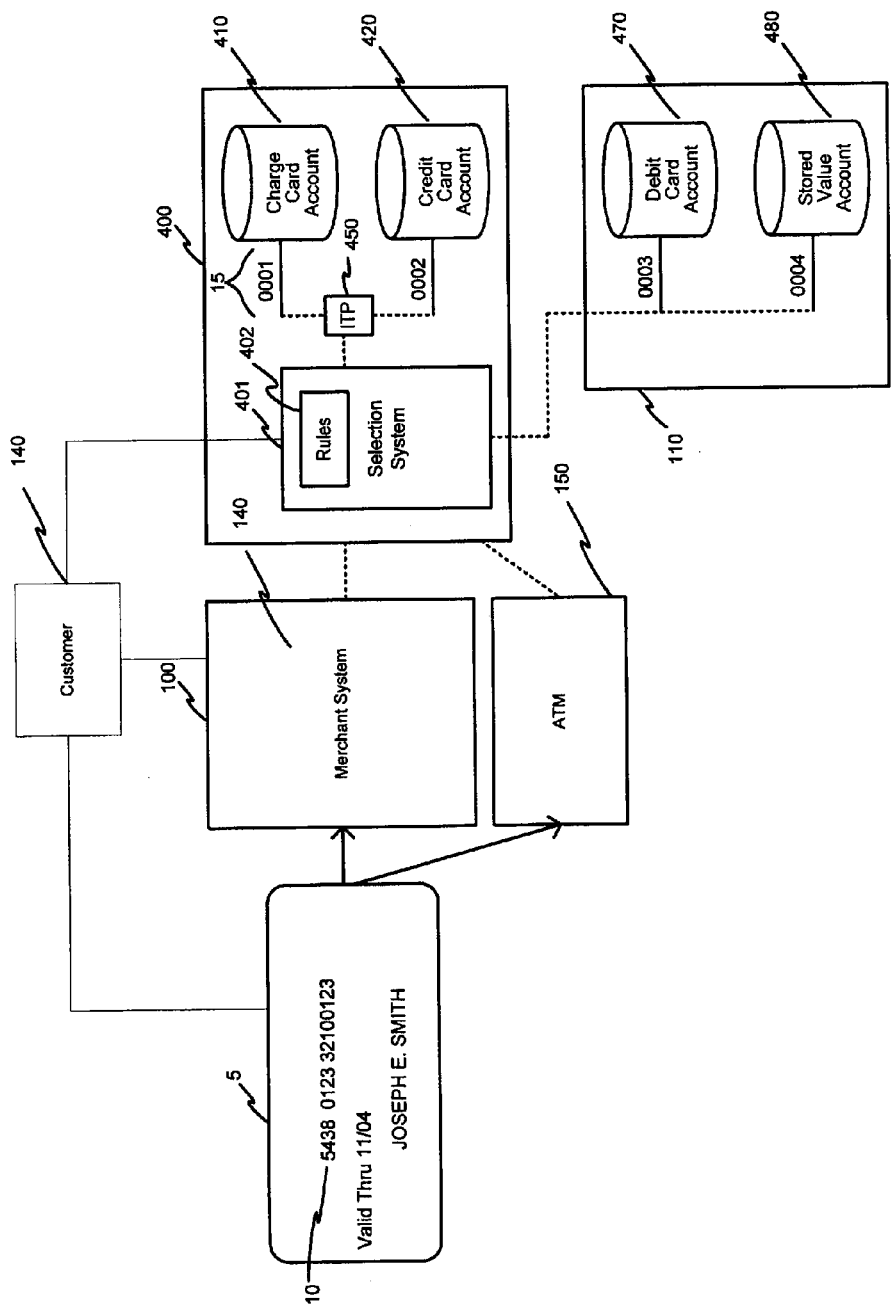
FIG. 1 illustrates a block diagram overview of an exemplary transaction account system.

A general exemplary system configuration may include, with reference to FIG. 1, a transaction account system 400 which may include a selection system 401, and one or more transaction accounts (e.g., 410 and 420). A consumer 140 may use a transaction account (represented, for example, by transaction account card 5) with various merchants 100, ATMs 150, and/or the like. Selection system 401 may be suitably configured to communicate with merchant system 100, ATMs 150, and/or consumers 140. In these examples, communications may take place in various manners, for example, via a network, or via any other modes of communication or with any other devices discussed herein or known in the art. In one exemplary embodiment of the present invention, transaction account system 400 is suitably configured to facilitate use of multiple transaction accounts through a single, "common" account identifier input.

The systems and/or components of the systems discussed herein may also include one or more host servers or other computing systems including a processor suitably configured to process digital data, a memory coupled to the processor for storing digital data, an input digitizer coupled to the processor for inputting digital data, an application program stored in the memory and accessible by the processor for directing processing of digital data by the processor, a display coupled to the processor and memory for displaying information derived from digital data processed by the processor and a plurality of databases, the databases including transaction account data, customer data, merchant data, financial institution data and/or like data that could be used in association with the present invention. As those skilled in the art may appreciate, a computer may also include an operating system (e.g., Windows NT, 95/98/2000, Linux, Solaris, etc.) as well as various conventional support software and drivers typically associated with computers.

Transaction accounts may exist internal to transaction account system 400 (e.g., 410 and 420). For example, American Express may issue both charge and credit accounts. Furthermore, transaction accounts may exist external to the issuer's transaction account system 400. For example, a non-American Express institution may offer debit, stored value accounts, and/or the like (e.g., 470 and 480) within an external transaction account system 110. The transaction accounts may include any combination of credit accounts, debit accounts, phone accounts, stored value accounts, loyalty accounts, and/or the like. Transaction accounts frequently are described herein in connection with a card, which is associated with a transaction account, e.g., a credit card, debit card, loyalty card, pre-paid card, diner's card, phone card, transponder, and/or the like. However, the transaction account may also exist in a non-physical embodiment. For example, a transaction account may be distributed in non-physical embodiments such as an account identifier, frequent flyer account, telephone calling account, and/or the like. Indeed, even if each transaction account has a corresponding physical embodiment, in one exemplary embodiment, it may be convenient to dispose with all but one of the cards. For example, where charge account 410 is associated with a charge card and where credit account 420 is associated with a credit card, one of the two cards may be used to perform transactions with both accounts. Thus, a consumer may find it convenient to carry only one of the two cards.

Furthermore, transaction accounts may be associated with various applications that allow the customers to participate in various programs, such as, for example, loyalty programs. A loyalty program may include one or more loyalty accounts. Exemplary loyalty programs include frequent flyer miles, on-line points earned from viewing or purchasing products at websites on-line, and programs associated with diner's cards, credit cards, debit cards, hotel cards, and/or the like. Generally, the user is both the owner of the transaction account and the participant in the loyalty program; however, this association is not necessary. For example, a participant in a loyalty program may gift loyalty points to a user who pays for a purchase with his own transaction account, but uses the gifted loyalty points instead of paying the monetary value.

For more information on loyalty systems, transaction systems, and electronic commerce systems, see, for example: U.S. Utility patent application Ser. No. 10/304,251, filed on Nov. 26, 2002 by inventors Antonucci et al. and entitled System and Method for Transfer of Loyalty Points; U.S. Continuation-In-Part patent application Ser. No. 10/378,456, filed on Mar. 3, 2003 by inventors Antonucci et al. and entitled System and Method for the Real-Time Transfer of Loyalty Points Between Accounts; U.S. patent application Ser. No. 09/836,213, filed on Apr. 17, 2001 by inventors Voltmer, et al. and entitled System And Method For Networked Loyalty Program; U.S. Continuation-In-Part patent application Ser. No. 10/027,984, filed on Dec. 20, 2001 by inventors Ariff, et al. and entitled System And Method For Networked Loyalty Program; U.S. Continuation-In-Part patent application Ser. No. 10/010,947, filed on Nov. 6, 2001 by inventors Haines, et al. and entitled System And Method For Networked Loyalty Program; U.S. Continuation-In-Part patent application Ser. No. 10/084,744, filed on Feb. 26, 2002 by inventors Bishop, et al. and entitled System And Method For Securing Data Through A PDA Portal; the Shop AMEX™ system as disclosed in Ser. No. 60/230,190, filed Sep. 5, 2000; the Loyalty As Currency™ and Loyalty Rewards Systems disclosed in Ser. No. 60/197,296 filed on Apr. 14, 2000, Ser. No. 60/200,492 filed Apr. 28, 2000, Ser. No. 60/201,114 filed May 2, 2000; a digital wallet system disclosed in U.S. Ser. No. 09/652,899 filed Aug. 31, 2000; a stored value card as disclosed in Ser. No. 09/241,188 filed on Feb. 1, 1999; a system for facilitating transactions using secondary transaction numbers disclosed in Ser. No. 09/800,461 filed on Mar. 7, 2001, and also in related provisional application Ser. No. 60/187,620 filed Mar. 7, 2000, Ser. No. 60/200,625 filed Apr. 28, 2000 and Ser. No. 60/213,323 filed May 22, 2000, all of which are herein incorporated by reference. Other examples of an online loyalty systems are disclosed in Netcentives U.S. Pat. No. 5,774,870, issued on Jun. 30, 1998, and U.S. Pat. No. 6,009,412, issued on Dec. 29, 1999, both of which are hereby incorporated by reference.

Transaction account system 400 may also include and/or be affiliated with an issuer system, in that the issuer of a transaction account may also be associated with the running of the transaction account system. The issuer system may include any software, hardware, financial institution, credit card company, bank, business, and/or the like that is suitably configured to issue a transaction account.

In accordance with exemplary embodiments, the issuer system may include a production system for producing physical embodiments of transaction accounts and/or for creating the transaction accounts. In addition, the issuer system may be suitably configured to track inventory, receive information from card distributors, receive information from third-party partner systems, identify fraud, replace lost transaction accounts, send commission payments, receive amounts owed, perform accounting, and/or the like for transaction accounts.

In accordance with various exemplary embodiments, the transaction accounts may be associated with a physical instrument. For example, a transaction card 5 is shown having an account identifier 10 embossed thereon. The card 5 may look, feel and function as an ordinary transaction card. For example, card 5 may include a pre-paid card, charge card, stored value card, rewards card, telephone card, bar code card, smart card, magnetic stripe card, radio frequency device (e.g., transponder), and/or the like. In yet another exemplary embodiment of the present invention, card 5 may be an electronic coupon, voucher, speed pass, and/or other such instrument. Card 5 may be used to pay for acquisitions, obtain access, provide identification, pay an amount, receive payment, redeem reward points and/or the like. In one example, a credit card may be used as a typical credit card. However, the credit card may also be used in connection with at least one other account, e.g. a stored value account. Nevertheless, it should be appreciated that although a physical card 5 is shown, no physical card is necessary. Indeed, the card number 10 shown on card 5 may be any number or other indicia, whether or not embodied in a tangible media.

Furthermore, the common account identifier (e.g., 10) may in various exemplary embodiments be one of the transaction account identifiers (identifying, for example, accounts 410, 420, 470, 480), or another number. For example, it is noted that the common account identifier may be an identification number provided by a third-party partner or by the issuer. The identifier may include any indicia such as, for example, a number, letter, symbol, signal and/or the like. The identifier may identify any one or more financial, transaction, identification, access or other account.

Card 5 may be associated with a common account identifier/card number. Furthermore, an "account identifier", "card number", "code", "identifier" or "loyalty number", as used herein, may include any device, code, or other identifier/indicia suitably configured to allow the consumer to interact or communicate with the system, such as, for example, authorization/access code, personal identification number (PIN), Internet code, other identification code, and/or the like that is optionally located on a rewards card, pre-paid card, telephone card, smart card, magnetic stripe card, bar code card, radio frequency card and/or the like. The account identifier may be distributed and stored in any form of plastic, electronic, magnetic, radio frequency, audio and/or optical device capable of transmitting or downloading data from itself to a second device. An account identifier may be, for example, a sixteen-digit card number, although each card provider has its own numbering system, such as the fifteen-digit numbering system used by an exemplary loyalty system. Each company's card numbers comply with that company's standardized format such that the company using a sixteen-digit format may generally use four spaced sets of numbers, as represented by the number "0000 0000 0000 0000". The first five to seven digits are reserved for processing purposes and identify the issuing bank, card type and etc. In this example, the sixteenth digit is used as a sum check for the sixteen-digit number. The intermediary eight-to-ten digits are used to uniquely identify the customer. In addition, loyalty account identifiers of various types may be used.

In an exemplary embodiment, the card 5 is configured to be used in connection with transactions with merchant 100. Furthermore, card 5 may be configured to communicate with a card reader, ATM 150, point of sale (POS) device, or other computerized device or terminal (hardware and/or software), and to transmit the card number 10 through a card processing network, e.g., debit network, to the card provider (e.g., transaction account system 400). Furthermore, merchant 100 may employ non-electronic means for capturing the card number and providing the transaction information to the card provider 400. As will be described in greater detail later, the cardholder may have multiple transaction accounts, which may be either maintained in one financial institution or may be distributed among many financial institutions. In an exemplary embodiment, each of the cardholder's transaction accounts are associated with separate transaction account identifiers.

With reference to the exemplary embodiment of FIG. 1, the card holder is illustrated as having four accounts, where charge card account 410 and credit card account 420 are internal to the card provider 400, accessible through an internal transaction processor 450. The card holder also has a debit card account 470 and stored value account 480 maintained by an external financial institution 110, which is external to the card provider and accessible through a card processing network.

In accordance with various exemplary embodiments, selection system 401 is configured to receive a common account identifier from a merchant (or third party), ATM, and/or the like, to recognize the common account identifier as one which represents more than one transaction account, to consult various rules or selection criteria from a rules engine (or selection criteria engine), and to determine which transaction account should appropriately be used for that transaction. Furthermore, selection system 401 is configured to replace and/or forward on the transaction account identifier corresponding to the selected transaction account. This forwarded transaction account identifier is specific to the transaction account that is to be used for that transaction. Furthermore, the system may access card processing systems within the issuer's system or external to the issuer's system. One embodiment for accessing includes a specific transaction account identifier forwarded to the particular system. For example, a transaction account identifier may be forwarded to external transaction account system 110.

Selection system 401 may further be configured to look up a received account identifier and to identify transaction accounts that are associated with that account identifier. If, for example, only one transaction account is associated with a received account identifier, then that account identifier may be passed along without further analysis. However, if two or more transaction accounts are associated with a received account identifier, then application of selection criteria may facilitate selection of the appropriate transaction account to process the transaction.

Thus, selection system 401 may be configured to consult various rules or selection criteria 402. These rules may be stored in a database or otherwise accessible for use by selection system 401. The rules may include any condition, criteria, circumstance, thresholds, maximum or minimum limits, analysis of third party information or other user information, and/or the like, that may be useful in selecting which account will process a transaction from among two or more transaction accounts.

In accordance with various exemplary embodiments, the rules may default to transaction account "A" (instead of "B") unless one or more conditions are satisfied. For example, the conditions may be the use of the transaction account identifier at a particular type of merchant. For example, gas stations may default to transaction account "A", while purchases from clothing merchants may be made through transaction account "B." In addition, the rules may be configured such that transactions made at an ATM may suitably default to, for example, a stored value account, while other transactions are charged to a charge card account. In another example, the conditions may be the use of the transaction account identifier at a particular merchant location, such as in-state vs. out of state transactions. In yet another example, conditions may involve transactions made through on-line internet transactions vs. off-line bricks and mortar type merchant transactions. In this example, a customer may desire to use a stored value card by default, but to use a credit card account for internet transactions. Moreover, the rules may involve a minimum, or maximum value, where transactions below or above that value would cause the transaction to occur on other than the default account. In the event that more than two accounts are available, the rules may be configured such that purchases within assigned ranges take place on the appropriate transaction account.

Rules may be further modified (and/or decisions with respect to which transaction account will be used may be made) in substantially real time, periodically, random, delayed or in batch mode. For example, with respect to substantially real-time, a customer may provide input at the time of use of the common account identifier that impacts the selection of the transaction account to be used for that transaction. In one exemplary embodiment, an ATM may be configured to receive such selection information. The ATM (and/or transaction account system 400) may be configured, for example, to recognize the dual transaction card nature of a card, and to ask the user to select the transaction account intended. The rules may also be modified or determined based upon biometric input. For example, use of a common account identifier with submission of a fingerprint of the left finger indicates that a debit account should be used, but submission of a fingerprint of the right finger indicates that a loyalty account should be used.

In another exemplary embodiment, at an ATM or POS terminal, the cardholder swipes card 5 through a card reader 100, e.g., POS terminal. The POS terminal reads card number 10, recognizes card 5, and prompts the cardholder for a Personal Identification Number ("PIN") 15. The cardholder enters the PIN 15 corresponding to the account to which cardholder desires to use. As one skilled in the art will appreciate, entering the PIN may include entering the number into a keypad, selecting an icon or button corresponding to the PIN, swiping the magnetic stripe on different sides corresponding to a different PIN, providing a different biometric to activate a particular PIN, any combination of the foregoing input methods and/or any other means or method for inputting the PIN into the system. For example, as shown in FIG. 1, if the cardholder desired to use his charge card account 410, the cardholder would enter his PIN 15 "0001."

Furthermore, the rules may be created, and/or adjusted from time to time, by the issuer of the transaction account, by the user of the transaction account, and/or the like. In one example, an issuer may provide an initial set of rules which the user may be permitted to modify. In another embodiment, the user may determine all the rules. In one exemplary embodiment, a user communicates with selection system 401 to create and/or modify the rules. For example, transaction account system 400 may be further configured with an interactive voice response system ("IVR") that may be suitably configured to receive a request from a customer to create/modify one or more rules. The IVR may be suitably configured to facilitate updating of an appropriate database with rule information.

In one embodiment, after determining which transaction account to use, and forwarding the corresponding transaction account identifier, the transaction accounts operate substantially as if the original transaction account identifier had been used from the beginning. Thus, rules to prevent overdraft of a checking account may be established such that the customer is not charged overdraft fees, but the transaction is treated as if it had been consummated using a credit card to begin with.

In various exemplary embodiments, an issuer of transaction accounts may distribute transaction accounts to consumers 140 using an intermediary third-party partner system. The third-party partner system may be suitably configured to perform many of the tasks discussed with reference to an issuer system (e.g., transaction account system 400.) Furthermore, in this exemplary embodiment, merchant 100 may be suitably configured to communicate with system 400 via the third-party partner system and to receive an approved/authorized message from the partner system. Similarly, system 400 may be suitably configured to receive communications from the partner system and to provide an approved/authorized message to the partner system. In accordance with an exemplary embodiment, the partner system may also include a database for converting the identification number associated with the transaction account from a third party partner's number to the issuer's number.

As used herein, the terms "user", "end user", "consumer", "customer" or "participant" may be used interchangeably with each other, and each shall mean any person, entity, machine, hardware, software, business, issuer system, and/or distributor system. A user may acquire by gift, purchase, or the like, a transaction account, for example, a credit card, and may use that card at different merchants to complete a purchase. The user may further have, for example, a stored value card or other transaction account, and use the credit card to conduct transactions with either their credit card account or stored value account. Also, each user may be equipped with a computing system to facilitate online commerce transactions. For example, the user may have a computing unit in the form of a personal computer, although other types of computing units may be used including laptops, notebooks, hand held computers, set-top boxes, and/or the like. The user computer may be in a home or business environment with access to a network. In an exemplary embodiment, access may be through the Internet through a commercially available webbrowser software package.

Although described as a merchant system herein, in general, merchant system 100 may be any service provider, retailer, financial institution, travel agency, software, hardware, or other entity that is suitably configured to conduct transactions using a transaction account. In accordance with various exemplary embodiments of the present invention, merchant system 100 is suitably configured to facilitate transactions with at least one transaction account. For example, the merchant may be configured to accept payment via a credit card and to communicate with a transaction account system 400 to charge payment to that credit card account. However, in accordance with an exemplary embodiment, merchant system 100 may additionally be configured to accept payment from a stored value account when the credit card is presented. The merchant may also be configured to accept payment, for example, via loyalty points and/or the like.

Although the present invention contemplates the use of a financial transaction card account for payment to a merchant, in other embodiments, transaction accounts may be credited by a merchant. Furthermore, transactions may be non-financial transactions. For example, loyalty points may be added to or subtracted from a loyalty points account.

In general, merchant system 100 is configured to communicate with transaction account system 400 to interact with an appropriate transaction account. The communication may vary depending on the technology used by merchant 100 and/or the type of merchant. In one exemplary embodiment, merchant system 100 is suitably configured with hardware and/or software, such as a cash register, having a point of sale device integrated therein. As another example, merchant system 100 may have a computing center such as a mainframe computer. However, the computing center of merchant system 100 may be implemented in other forms, such as a personal computer, a mini-computer, a PC server, a network set of computers, or the like.

The computer is suitably configured to receive input regarding the transaction and/or identifying the transaction account. For example, the computer may be suitably configured to scan a bar code, read a magnetic stripe on a card, and/or receive a manually input account identifier. Furthermore, the merchant computer may be suitably configured to request approval of the transaction. The computer may also be suitably configured to receive an 'approved/authorized' message that authorizes the transaction.

Merchant system 100 may also be suitably configured to communicate other information. In one exemplary embodiment, the information communicated includes the an account identifier, the date of the transaction, the amount of the transaction, and/or the like. The communicated information may be useful for the merchant and the transaction account for reconciling amounts owed between themselves, to limit fraud, to provide additional services, and/or the like. This other information may be sent at the time of the purchase, or as a batch process on a periodic basis. The information may, for example, be communicated via batch processing that is performed on a daily basis, in real time, and/or at some other appropriate interval. The information may be communicated to the issuer system directly in electronic format or indirectly in a verbal, or printed format that later is entered in electronic format into the issuer system.

The merchant system 100 may include a computer that may be suitably configured to provide a suitable website or other Internet-based graphical user interface that is accessible by users. In one embodiment, the Internet Information Server, Microsoft Transaction Server, and Microsoft SQL Server, are used in conjunction with the Microsoft operating system, Microsoft NT web server software, a Microsoft SQL database system, and a Microsoft Commerce Server. Additionally, components such as Access or SQL Server, Oracle, Sybase, Informix MySQL, Intervase, etc., may be used to provide an ADO-compliant database management system. The term "webpage" as it is used herein is not meant to limit the type of documents and applications that might be used to interact with the user. For example, a typical website might include, in addition to standard HTML documents, various forms, Java applets, Javascript, active server pages (ASP), common gateway interface scripts (CGI), extensible markup language (XML), dynamic HTML, cascading style sheets (CSS), helper applications, plug-ins, and/or the like.

Furthermore, the terms "business" or "merchant" may be used interchangeably with each other and shall mean any person, entity, distributor system, software and/or hardware that is a provider, broker and/or any other entity in the distribution chain of goods or services. For example, the merchant may be a grocery store, an on-line merchant, and/or the like. With regard to use of the transaction account, the user may communicate with the merchant in person (e.g., at the box office), telephonically, or electronically (e.g., from a user computer via an internet). During the interaction, the merchant may offer goods and/or services to the user. The merchant may also offer the user the option of paying for the acquisition using a transaction account. Furthermore, the transaction account may be used by the merchant as a form of identification of the user. The merchant may also have a computing unit implemented in the form of a computer-server, although other implementations are possible.

In general, the common transaction account may be used for transactions much like other transaction accounts. Communication between the user and/or merchant and the system of the present invention is accomplished through any suitable communication means, such as, for example, a telephone network, Intranet, Internet, point of interaction device (point of sale device, personal digital assistant, cellular phone, kiosk, etc.), online communications, off-line communications, wireless communications, and/or the like. One skilled in the art may also appreciate that, for security reasons, any databases, systems, or components of the present invention may consist of any combination of databases or components at a single location or at multiple locations, wherein each database or system includes any of various suitable security features, such as firewalls, access codes, encryption, de-encryption, compression, decompression, and/or the like.

It may be appreciated that many applications of the present invention could be formulated. One skilled in the art may appreciate that a network may include any system for exchanging data or transacting business, such as the Internet, an intranet, an extranet, WAN, LAN, satellite communications, and/or the like. It is noted that the network may be implemented as other types of networks, such as an interactive television (ITV) network. The users may interact with the system via any input device such as a keyboard, mouse, kiosk, personal digital assistant, handheld computer (e.g., Palm Pilot®), cellular phone and/or the like. Similarly, the invention could be used in conjunction with any type of personal computer, network computer, workstation, minicomputer, mainframe, or the like running any operating system such as any version of Windows, Windows NT, Windows2000, Windows 98, Windows 95, MacOS, OS/2, BeOS, Linux, UNIX, Solaris or the like. Moreover, although the invention is frequently described herein as being implemented with TCP/IP communications protocols, it may be readily understood that the invention could also be implemented using IPX, Appletalk, IP-6, NetBIOS, OSI or any number of existing or future protocols. Moreover, the system may contemplate the use, sale or distribution of any goods, services or information over any network having similar functionality described herein.

The computing units may be connected with each other via a data communication network. The network may be a public network and assumed to be insecure and open to eavesdroppers. In the illustrated implementation, the network may be embodied as the internet. In this context, the computers may or may not be connected to the internet at all times. For instance, the customer computer may employ a modem to occasionally connect to the internet, whereas the bank computing center might maintain a permanent connection to the internet. Specific information related to the protocols, standards, and application software utilized in connection with the Internet may not be discussed herein. For further information regarding such details, see, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997). LOSHIN, TCP/IP CLEARLY EXPLAINED (1997). All of these texts are hereby incorporated by reference.

The systems may be suitably coupled to the network via data links. A variety of conventional communications media and protocols may be used for data links. For example, a connection to an Internet Service Provider (ISP) over the local loop as is typically used in connection with standard modem communication, cable modem, Dish networks, ISDN, Digital Subscriber Line (DSL), or various wireless communication methods. The merchant system might also reside within a local area network (LAN) that interfaces to the network via a leased line (T1, D3, etc.). Such communication methods are well known in the art and are covered in a variety of standard texts. See, e.g., GILBERT HELD, UNDERSTANDING DATA COMMUNICATIONS (1996), hereby incorporated by reference.

The merchant, third-party partner, and/or the issuer may be interconnected via a second network and/or a third network, each referred to as a payment network. The payment network represents existing proprietary networks that presently accommodate transactions for credit cards, debit cards, and other types of financial/banking cards. The payment network is a closed network that is assumed to be secure from eavesdroppers. Examplary transaction networks may include the American Express®, VisaNet® and the Veriphone® networks.

Any databases discussed herein may be any type of database, such as relational, hierarchical, graphical, object-oriented, and/or other database configurations. Common database products that may be used to implement the databases include DB2 by IBM (White Plains, N.Y.), various database products available from Oracle Corporation (Redwood Shores, Calif.), Microsoft Access or Microsoft SQL Server by Microsoft Corporation (Redmond, Wash.), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, and/or the like. The association step may be accomplished by a database merge function, for example, using a "key field" in pre-selected databases or data sectors.

More particularly, a "key field" partitions the database according to the high-level class of objects defined by the key field. For example, certain types of data may be designated as a key field in a plurality of related data tables and the data tables may then be linked on the basis of the type of data in the key field. In this regard, the data corresponding to the key field in each of the linked data tables is preferably the same or of the same type. However, data tables having similar, though not identical, data in the key fields may also be linked by using AGREP, for example. In accordance with one aspect of the present invention, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); block of binary (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In one exemplary embodiment, the ability to store a wide variety of information in different formats is facilitated by storing the information as a Block of Binary (BLOB). Thus, any binary information may be stored in a storage space associated with a data set. As discussed above, the binary information may be stored on the financial transaction instrument or external to but affiliated with the financial transaction instrument. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data associated with the financial transaction instrument by multiple and unrelated owners of the data sets. For example, a first data set which may be stored may be provided by a first issuer, a second data set which may be stored may be provided by an unrelated second issuer, and yet a third data set which may be stored, may be provided by an third issuer unrelated to the first and second issuer. Each of these three exemplary data sets may contain different information that is stored using different data storage formats and/or techniques. Further, each data set may contain subsets of data which also may be distinct from other subsets.

As stated above, in various embodiments of the present invention, the data may be stored without regard to a common format. However, in one exemplary embodiment of the present invention, the data set (e.g., BLOB) may be annotated in a standard manner when provided for manipulating the data onto the financial transaction instrument. The annotation may comprise a short header, trailer, or other appropriate indicator related to each data set that is suitably configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be suitably configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier and/or the like. Each of these condition annotations are further discussed herein.

The data set annotation may also be used for other types of status information as well as various other purposes. For example, the data set annotation may include security information establishing access levels. The access levels may, for example, be suitably configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified merchants are permitted to access the data set for reading, and others are altogether excluded from accessing the data set. However, other access restriction parameters may also be used allowing various entities to access a data set with various permission levels as appropriate.

The data, including the header or trailer may be received by a stand alone interaction device suitably configured to add, delete, modify, or augment the data in accordance with the header or trailer. As such, in one preferred embodiment, the header or trailer is not stored on the transaction device along with the associated issuer-owned data but instead the appropriate action may be taken by providing to the transaction instrument user at the stand alone device, the appropriate option for the action to be taken. However, the present invention contemplates a data storage arrangement wherein the header or trailer, or header or trailer history, of the data is stored on the transaction instrument in relation to the appropriate data.

One skilled in the art will also appreciate that, for security reasons, any databases, systems, devices, servers or other components of the present invention may consist of any combination thereof at a single location or at multiple locations, wherein each database or system includes any of various suitable security features, such as firewalls, access codes, encryption, decryption, compression, decompression, and/or the like.

Figure 2:
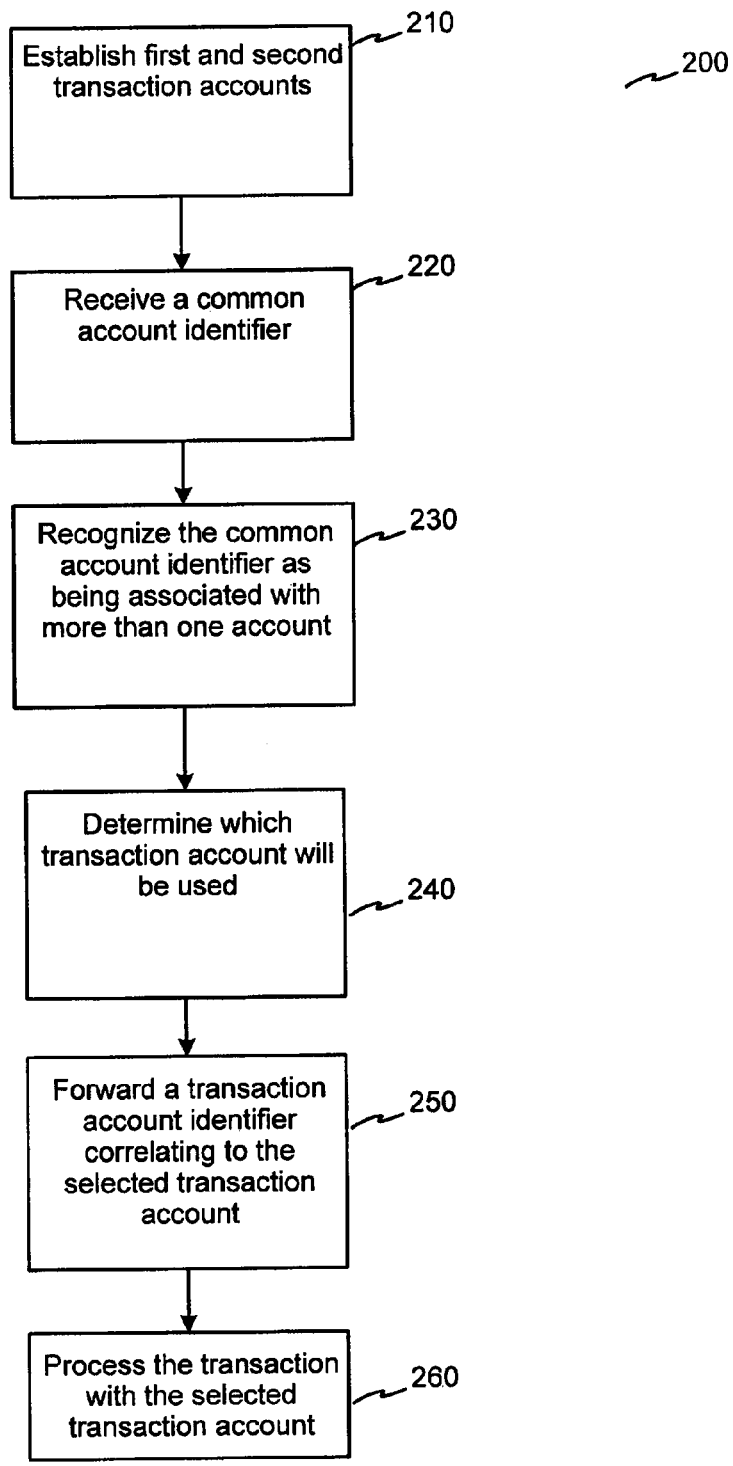
FIG. 2 illustrates a flow diagram showing an exemplary "one to many" transaction account method.

The foregoing system components may be suitably configured for performing the following method which may facilitate the use of multiple transaction accounts with a single common account identifier and/or card. With reference to FIG. 2, an exemplary method 200 may include one or more of the following steps: establishing a first transaction account and a second transaction account (step 210), receiving a common account identifier (step 220), recognizing the common account identifier as being associated with more than one account (step 230), determining which transaction account will be used (step 240), forwarding a transaction account identifier correlating to the selected transaction account (step 250), and/or processing the transaction with the selected transaction account (step 260).

In accordance with various exemplary embodiments, establishing a first transaction account and a second transaction account (step 210) may be performed using any suitable method now known or here after discovered. In one exemplary embodiment, the first transaction account is different in nature than the second transaction account. For example, the first transaction account may be a credit card account and the second transaction account may be a stored value account. Furthermore, the first and second transaction accounts may be unrelated other than due to the association with a common account identifier. Moreover, "establishing" the accounts may not necessarily include creating the accounts; rather, establishing may include obtaining information related to previously opened accounts (e.g., external accounts) such that the system may access the accounts.

In this regard, at any appropriate point in this exemplary method, a common account identifier is associated with the first and second accounts. This association may take place in response to a customer request to use two or more cards from a single card. In other embodiments, the issuer may cause this association. In any event, the association may be recorded in a database, look-up table, or the like. Creation of the common account identifier may include both electronic and physical activities. For example, a card may be created physically and/or the common account identifier created electronically. The common account identifier may be created electronically by, for example, creating a common account identifier that is associated with the transaction accounts. In various embodiments, the common account identifier may be one of the account identifiers for the first and second transaction accounts.

The account identifiers may be, for example, a credit card number or other number as described herein. For security reasons, the account identifiers may be a random number and/or the account identifiers may also include routing information prior to the random number. The account identifiers may be associated with other account specific information in a database, look up table and/or the like. For example, in a stored value account, the account may be suitably configured to be worth a particular number of minutes, a pre-determined value, a specific reward, and/or the like.

With regard to a common account identifier involving a physical transaction instrument, the financial transaction instrument may include, for example, a magnetic stripe card, smart card, bar code card, transponder, and/or the like. The issuer system may provide a card account identifier (i.e., the common account identifier) to a manufacturer that produces the physical transaction instrument and that encodes the instrument and/or packaging for the transaction instrument. The manufacturer may create, for example, a card. The manufacturer may further package the card by inserting the card into an envelope. The transaction accounts may be distributed directly or indirectly to consumers. For additional information related to distribution of an account identifier, see for example, U.S. Ser. No. 08/456,525 filed on Jun. 1, 1995 by inventor John M. Taskett and entitled METHODS AND APPARATUS FOR PROVIDING A PREPAID, REMOTE ENTRY CUSTOMER ACCOUNT, which is hereby incorporated by reference.

A customer may present the common account identifier during a transaction, whereupon the merchant, ATM, or the like, may attempt to seek approval for the transaction. Thus, for example, merchant 100 may send a signal comprising the common account identifier, to transaction account system 400, which may be configured for receiving the common account identifier (step 220). For example, selection system 401 may be configured to receive the common account identifier. Furthermore, in various exemplary embodiments, other transaction information may also be transmitted to the issuer system and it may be associated with the common account identifier.

In one exemplary embodiment, the common account identifier includes at least a portion of a machine readable code, such as a bar code. In another example, the common account identifier may be stored in a magnetic stripe encoded format. In other exemplary embodiments, the common account identifier may be entered into an electronic system manually or by other means (bar code, machine readable code, etc.). For example, the various processes may include a user facilitating the input of information into a computer system. The information may be inputted via keypad, magnetic stripe, smart card, electronic pointer, touchpad and/or the like, into a user computer, POS terminal, kiosk, and/or ATM terminal. The information may be transmitted via any network. In another example, an internet webpage based system may be suitably configured with fields for manual or automatic entry of a common account identifier as well as other transaction information.

The information may be stored and transmitted in batches, or transmitted in substantially real time. A batch transmission of transaction information may, for example, include several transactions including various products, individual transaction information, and/or summary information. For example, a single batch transmission may include the transmission of a file containing a summary of amounts the issuer owes to the merchant, the total amount of that day's transactions, and/or specific information specifying the common account identifiers used and the value of the transactions. In another exemplary embodiment, the transaction information is communicated to issuer system via the internet or other suitable communication systems. The selection system 401 may receive the transaction information and may analyze that information.

The selection system is configured to recognize the common account identifier as being associated with more than one account (step 230). For example, the common account identifier may be "looked-up" in a database to see if more than one transaction account is associated with the common account identifier. If not, the common account identifier is solely related to a single account and it may be forwarded to internal transaction processor 450 for processing using typical processing techniques. However, if more than one transaction account is associated with the common account identifier, the selection system may determine which transaction account will be used (step 240).

This determination may take place through the use of rules or selection criteria. Although such rules may be implemented in various ways, in one exemplary embodiment, transaction information is compared to criteria in a look-up table for the applicable common account identifier. For example, the selection criteria may include a dollar amount above which the transaction is to take place on the second account. In this example, the dollar amount of the transaction may be obtained from the transaction information and compared to this selection criteria and a determination as between the first and second accounts may be made.

After determining which of the multiple accounts should be used for a current transaction, the transaction account identifier correlating to the selected transaction account may be forwarded to internal transaction processor 450 (step 250).

Internal transaction processor 450 is configured to receive transaction information and perform the various processing steps typically found in issuer systems. For example, the internal transaction processor may receive the forwarded account identifier of the first or second transaction account and forward that account identifier to the system responsible for processing information related to that transaction account.

In accordance with yet another exemplary embodiment, issuer system or transaction account system 400 is configured to process the transaction with the selected transaction account (step 260). For example, the transaction account system may be suitably configured to verify that the transaction is approved or should be declined. In other examples, the processing may involve the reconciliation process, crediting, debiting, adding or subtracting points, and/or the like. The infrastructure may further be suitably configured to detect fraud (e.g., detect an attempt to use a card that has not yet been sold), and/or to refund or replace a lost transaction account. The system may also utilize the common account identifier solely, the particular account identifier solely or a combination of identifiers through any part of the process, including substituting one identifier for the other or using a proxy identifier during any part of the process.

In some exemplary embodiments involving a third-party partner, the primary contact with merchant 100 may be through the third-party partner. Thus, the transaction account system is suitably configured, in this case, to receive the common account identifier from the third-party partner system. The third-party partner system may also be configured to recognize the information it receives, and may translate its own account identifier to a corresponding issuer common number, which is forwarded to transaction account system 400. Approval/authorization of the transaction may be similarly sent to the third-party partner system to be converted and/or conveyed back to merchant system 100.

From the transaction account system's perspective, an issuer is able to attract consumers to use one if its cards as the base platform from which other cards are used, including those of its competitors. The issuer is also able to offer convenient customization opportunities to its customers. For example, the issuer may also receive input from a consumer, via a web-site, editing or creating customer selected rules. The issuer uses those rules to intercept a transaction card authorization request and to replace the common account identifier with the corresponding transaction account identifier.

From the merchant's perspective, customers enter their places of business with additional options available for completing transactions and purchases. Furthermore, the merchant may never be aware of whether the transaction took place through account "A" or account "B." From the customer's perspective, a customer obtains the benefit and convenience of carrying fewer cards, and using multiple accounts in a useful manner. Furthermore, the customer may receive a single bill combining all of the billing information for the multiple accounts into one consolidated billing statement.

The present invention may be described herein in terms of functional block components, optional selections and/or various processing steps. It should be appreciated that such functional blocks may be realized by any number of hardware and/or software components suitably configured to perform the specified functions. For example, the present invention may employ various integrated circuit components, e.g., memory elements, processing elements, logic elements, look-up tables, and/or the like, which may carry out a variety of functions under the control of one or more microprocessors or other control devices. Similarly, the software elements of the present invention may be implemented with any programming or scripting language such as C, C++, Java, COBOL, assembler, PERL, Visual Basic, SQL Stored Procedures, extensible markup language (XML), with the various algorithms being implemented with any combination of data structures, objects, processes, routines or other programming elements. Further, it should be noted that the present invention may employ any number of conventional techniques for data transmission, messaging, data processing, network control, and/or the like. Still further, the invention could be used to detect or prevent security issues with a client-side scripting language, such as JavaScript, VBScript or the like. For a basic introduction of cryptography and network security, the following may be helpful references: (1) "Applied Cryptography: Protocols, Algorithms, And Source Code In C," by Bruce Schneier, published by John Wiley & Sons (second edition, 1996); (2) "Java Cryptography" by Jonathan Knudson, published by O'Reilly & Associates (1998); (3) "Cryptography & Network Security: Principles & Practice" by Mayiam Stalling, published by Prentice Hall; all of which are hereby incorporated by reference.

It should be appreciated that the particular implementations shown and described herein are illustrative of the invention and its best mode and are not intended to otherwise limit the scope of the present invention in any way. Indeed, for the sake of brevity, conventional data networking, application development and other functional aspects of the systems (and components of the individual operating components of the systems) may not be described in detail herein. It should be noted that many alternative or additional functional relationships or physical connections might be present in a practical transaction account system.

As may be appreciated by one of ordinary skill in the art, the present invention may be embodied as a method, a data processing system, a device for data processing, a financial transaction device, and/or a computer program product. Accordingly, the present invention may take the form of an entirely software embodiment, an entirely hardware embodiment, or an embodiment combining aspects of both software and hardware or other physical devices. Furthermore, the present invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

These computer program instructions may also be stored in a computer-readable memory that may direct a computer or other programmable data processing apparatus to function in a particular manner, such that the instructions stored in the computer-readable memory produce an article of manufacture including instruction means which implement functions of flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus include steps for implementing the functions specified in the flowchart block or blocks.

In the foregoing specification, the invention has been described with reference to specific embodiments. However, it may be appreciated that various modifications and changes may be made without departing from the scope of the present invention. The specification and figures are to be regarded in an illustrative manner, rather than a restrictive one, and all such modifications are intended to be included within the scope of present invention. Accordingly, the scope of the invention should be determined by the appended claims and their legal equivalents, rather than by the examples given above. For example, the steps recited in any of the method or process claims may be executed in any order and are not limited to the order presented.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical".

What is claimed is:

1. A method comprising:

determining, by a computer based system for facilitating use of a transaction account and based on selection criteria associated with a common transaction account, at least one of a first transaction account and a second transaction account to access for processing a transaction in response to receiving a common transaction account identifier, resulting in a selected transaction account, wherein said first transaction account and said second transaction account are associated with said common transaction account, wherein said selection criteria is defined by an owner of said common transaction account prior to a transaction being initiated, wherein said selection criteria comprises said first transaction account being selected in response to said transaction being initiated with at least one of a first group of merchants and a first type of products, and said second transaction account being selecting in response to a transaction being initiated with at least one of a second group of merchants and a second type of products, and wherein said selection criteria further comprises, said first transaction account being selected in response to a transaction amount being within a first range of amounts, and said second transaction account being selected in response to said transaction amount being within a second range of amounts, and wherein said first range of amounts and said second range of amounts are non-overlapping;

communicating, by said computer based system and in response to said determining, an authorization request to a selected authorizer associated with said selected transaction account;

receiving, by said computer based system and in response to said communicating, at least one of a first biometric indicator and a second biometric indicator, wherein said first biometric indicator is associated with said first transaction account and said second biometric indicator is associated with said second transaction account;

accessing, by said computer based system, said selected transaction account based on said selection criteria and at least one of said first biometric indicator and said second biometric indicator; and processing, by said computer based system, said transaction via said selected transaction account.

2. The method of claim 1, further comprising receiving, by said computer based system, a common account identifier associated with said common transaction account.

3. The method of claim 2, further comprising recognizing, by said computer based system, said common account identifier as being associated with more than one account.

4. The method of claim 2, wherein a merchant is only provided with said common account identifier.

5. The method of claim 2, further comprising a settlement process comprising:

processing, by said computer based system, a request for payment to a merchant when said merchant submits a settlement record associated with said common account identifier;

recording, by said computer based system, transactions processed as settlement records in a settlement table; and paying, by said computer based system, said merchant.

6. The method of claim 1, wherein said first transaction account is associated with a first account identifier and a first authorizer, and wherein said second transaction account is associated with a second account identifier and a second authorizer.

7. The method of claim 6, further comprising replacing, by said computer based system, said common account identifier with one of said first and second transaction account identifiers associated with said selected transaction account.

8. The method of claim 6, further comprising:

receiving, by said computer based system, an authorization from at least one of said first authorizer and said second authorizer; and authorizing, by said computer based system, said transaction amount to said common account.

9. The method of claim 1, further comprising sending, by said computer based system, a bill to an account holder associated with said common account identifier, wherein said bill includes bill reporting information that relates to said first transaction account and said second transaction account.

10. The method of claim 1, further comprising:

receiving, by said computer based system, a reconciliation file including said common account identifier;

recognizing, by said computer based system, said common account identifier as being associated with more than one account;

determining, by said computer based system, based on said selection criteria, at least one of said first and second transaction accounts to access for processing said transaction, resulting in a selected transaction account;

accessing, by said computer based system, said selected transaction account system based on said determining step; and processing, by said computer based system, said reconciliation file via a system associated with said selected transaction account.

11. The method of claim 1, wherein said selection criteria is modifiable by a user of said first and second transaction accounts.

12. The method of claim 1, further comprising overriding, by said computer based system, said selection criteria, in response to receiving at least one of a first biometric indicator and a second biometric indicator.

13. The method of claim 1, further comprising authorizing, by said computer based system, at least one of said first transaction account and said second transaction account based on at least one of a first biometric indicator and a second biometric indicator.

14. A computer based system for facilitating use of a transaction account comprising:
a non-transitory memory;
a network interface communicating with said non-transitory memory;
a processor in electronic communication with said memory;
said processor, when executing a computer program, performs operations comprising:
determining, by said processor and based on selection criteria associated with a common transaction account, at least one of a first transaction account and a second transaction account to access for processing a transaction in response to receiving a common transaction account identifier, resulting in a selected transaction account,
wherein said first transaction account and said second transaction account are associated with said common transaction account,
wherein said selection criteria is defined by an owner of said common transaction account prior to a transaction being initiated,
wherein said selection criteria comprises said first transaction account being selected in response to said transaction being initiated with at least one of a first group of merchants and a first type of products, and said second transaction account being selecting in response to a transaction being initiated with at least one of a second group of merchants and a second type of products, and
wherein said selection criteria further comprises, said first transaction account being selected in response to a transaction amount being within a first range of amounts, and said second transaction account being selected in response to said transaction amount being within a second range of amounts, and wherein said first range of amounts and said second range of amounts are non-overlapping;
communicating, by said processor and in response to said determining, an authorization request to a selected authorizer associated with said selected transaction account;
receiving, by said processor and in response to said communicating, at least one of a first biometric indicator and a second biometric indicator, wherein said first biometric indicator is associated with said first transaction account and said second biometric indicator is associated with said second transaction account;
accessing, by said processor, said selected transaction account based on said selection criteria and at least one of said first biometric indicator and said second biometric indicator; and processing, by said processor, said transaction via said selected transaction account.

15. A tangible non-transitory computer-readable storage medium having computer-executable instructions stored thereon that, when executed by a computer based system for facilitating use of a transaction account, cause said computer based system to perform operations comprising:
determining, by said computer based system and based on selection criteria associated with a common transaction account, at least one of a first transaction account and a second transaction account to access for processing a transaction in response to receiving a common transaction account identifier, resulting in a selected transaction account,
wherein said first transaction account and said second transaction account are associated with said common transaction account,
wherein said selection criteria is defined by an owner of said common transaction account prior to a transaction being initiated,
wherein said selection criteria comprises said first transaction account being selected in response to said transaction being initiated with at least one of a first group of merchants and a first type of products, and said second transaction account being selecting in response to a transaction being initiated with at least one of a second group of merchants and a second type of products, and
wherein said selection criteria further comprises, said first transaction account being selected in response to a transaction amount being within a first range of amounts, and said second transaction account being selected in response to said transaction amount being within a second range of amounts, and wherein said first range of amounts and said second range of amounts are non-overlapping;
communicating, by said computer based system and in response to said determining, an authorization request to a selected authorizer associated with said selected transaction account;
receiving, by said computer based system and in response to said communicating, at least one of a first biometric indicator and a second biometric indicator, wherein said first biometric indicator is associated with said first transaction account and said second biometric indicator is associated with said second transaction account;
accessing, by said computer based system, said selected transaction account based on said selection criteria and at least one of said first biometric indicator and said second biometric indicator; and
processing, by said computer based system, said transaction via said selected transaction account.

* * * * *